Jan. 2, 1951    O. THAU-JENSEN    2,536,669
ROOT PIN FOR USE IN REINFORCEMENT INLAYS,
CAST CROWNS, AND PIVOT TEETH
Filed July 28, 1948

Patented Jan. 2, 1951

2,536,669

UNITED STATES PATENT OFFICE 2,536,669

ROOT PIN FOR USE IN REINFORCEMENT INLAYS, CAST CROWNS, AND PIVOT TEETH

Orla Thau-Jensen, Hurup, Thy, Denmark

Application July 28, 1948, Serial No. 41,148
In Denmark July 29, 1947

1 Claim. (Cl. 32—13)

This invention relates to root-pins for use in reinforcement inlays, cast crowns and pivot teeth made of metal or acrylic materials.

The novel and characteristic feature of the root-pin in accordance with the invention resides in the fact that the pin is provided with a flattened head which on both sides is formed with depressions and projections and is larger than the shank of the pin, and that the surface of the latter is formed with pressed or cut depressions or grooves.

Root-pins of the type known hithertofore comprise a pointed shank and a head. The pointed shank is secured in the tooth-root while the head retains the denture applied thereto by casting or pressing. The head of the pin is formed with a small facet which serves to counteract rotation of the crown. This kind of pins is especially intended for use in porcelain jackets but when used in conjunction with materials applied to the pin by casting or pressing, the risk of rotation is considerable. In comparison with these known root-pins, the root-pin in accordance with the invention presents the advantage of having a large embossed head which prevents any risk of rotation of the crown relative to the pin. Besides the pattern of the embossed head will increase the retention, and the flattened head is more easy to hide in the crown than in the case with the known pins.

It has been proposed to use steel-pins having embossed heads for the retention of acrylic clamps and bars, but it has heretofore not been known to combine this device with root-pins.

The flattened head of the root-pin in accordance with this invention may be formed with one or more perforations such as a cylindrical hole extending through the head, whereby the connection between the root-pin and the material applied thereto is further improved.

Figure 1:
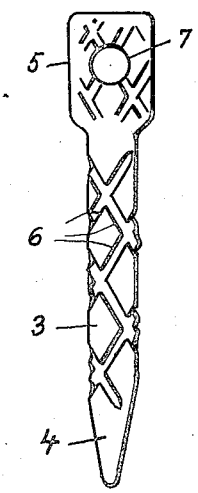
Figure 2:
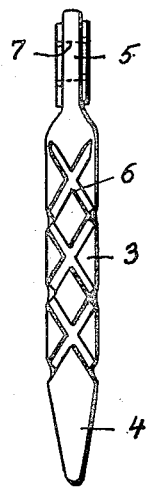

In order that my invention may be readily understood and readily carried into effect, reference will now be had to the accompanying drawing in which Figures 1 and 2 are a front view and a side view respectively of a root-pin in accordance with the invention.

The root-pin illustrated in the drawing comprises a substantially cylindrical shank 3, which is pointed at one end as at 4 and flattened at the other end, so that a head 5 is formed which is wider than the shank of the pin. During the process of flattening the head, the latter is at the same time provided with a relief pattern which may be composed of projections or depressions, or both. The relatively large flat head prevents any rotation of the crown relative to the pin, and the pattern of the faces of the head increases the retention.

The shank 3 of the pin is also formed with a relief pattern comprising depressions 6, which may suitably be in the form of inclined grooves in the material. The depressions should be arranged in such a manner as to not weaken the pin and as to provide retention of a root-plate, if any, applied to the pin by casting and moreover the depression should provide for adhesion between the pin and the surface of the root-channel. The fact that the relief-pattern of the shank is composed of depressions ensure a good contact between the shank and the root-channel at the same time as an excess of cement for securing the pin is allowed to pass out through the channels of the relief, so that only the exact amount of cement required is left.

The point of the pin conforms with the shape of the tooth-root. The shape of the pin is especially intended to prevent perforation and fractures of the root.

The flattened, embossed head 5 which is substantially rectangular with its side-lines parallel with the axes of the shank, is provided with a cylindrical hole 7, extending through the head.

The root-pin in accordance with the invention is especially fit for use in conjunction with acrylic material, which in recent years has found an extensive use in dental surgery.

I claim:

A root-pin for dental use, including a substantially cylindrical shank which is pointed at one end to conform to the shape of a tooth-root canal and flattened and widened at the other end to form a substantially rectangular head having two side edges thereof substantially parallel to the longitudinal axis of the shank, the head being symmetrically disposed on the shank and the latter and the head both being formed with retaining means in the surfaces upon each which are inclined in two opposite directions with respect to the longitudinal axis of said shank.

ORLA THAU-JENSEN.

REFERENCES CITED

The following references are of record in the file of this patent:

UNITED STATES PATENTS

| Number | Name | Date |
|---|---|---|
| 277,392 | Weston | May 8, 1883 |
| 317,259 | Williams | May 5, 1885 |
| 1,383,029 | Schick | June 28, 1921 |